(12) United States Patent (10) Patent No.: US 12,560,527 B2

Heilskov et al. (45) Date of Patent: Feb. 24, 2026

(54) SYSTEM FOR EVALUATING GRAIN IN GRAIN HANDLING SYSTEMS

(71) Applicant: SUKUP MANUFACTURING CO., Sheffield, IA (US)

(72) Inventors: Casey Scott Heilskov, Hampton, IA (US); Matthew Koch, Clear Lake, IA (US); David Jay Brownmiller, Mason City, IA (US); Ryan Eilertson, Sheffield, IA (US)

(73) Assignee: SUKUP MANUFACTURING CO., Sheffield, IA (US)

( * ) Notice: Subject to any disclaimer, the term of this patent is extended or adjusted under 35 U.S.C. 154(b) by 692 days.

(21) Appl. No.: 17/942,263

(22) Filed: Sep. 12, 2022

(65) Prior Publication Data

US 2023/0082011 A1 Mar. 16, 2023

Related U.S. Application Data

(60) Provisional application No. 63/243,264, filed on Sep. 13, 2021.

(51) Int. Cl.
| | |
|---|---|
| *G01N 21/01* | (2006.01) |
| *A01B 76/00* | (2006.01) |
| *G01N 21/85* | (2006.01) |

(52) U.S. Cl.
CPC ............ *G01N 21/01* (2013.01); *A01B 76/00* (2013.01); *G01N 21/85* (2013.01); *G01N 2021/0106* (2013.01)

(58) Field of Classification Search
CPC .... G01N 21/01; G01N 21/85; G01N 2021/00; A01B 76/00
See application file for complete search history.

(56) References Cited

U.S. PATENT DOCUMENTS

| | | | | | |
|---|---|---|---|---|---|
| 4,576,209 | A | * | 3/1986 | Eisenberg | B65B 1/363 |
| | | | | | 222/196 |
| 4,818,132 | A | * | 4/1989 | Brull | G01V 8/14 |
| | | | | | 400/711 |

(Continued)

FOREIGN PATENT DOCUMENTS

WO WO-2016059865 A1 * 4/2016 ......... G01N 21/3563

OTHER PUBLICATIONS

English Translation of WO-2016059865-A1 (Year: 2016).*

(Continued)

*Primary Examiner* — Claude J Brown

(74) *Attorney, Agent, or Firm* — Christopher A. Proskey; BrownWinick Law Firm

(57) ABSTRACT

A system is presented for evaluating grain in a grain handling system. The system includes a sensor system and a sample conveyor system. In one or more arrangements, the sensor system is operatively connected to the grain handling system and includes an optical sensor. The sample conveyor system is configured to collect samples of grain in the grain handling system, deliver the samples of grain to the sensor system, and remove the samples of grain from the sensor system. The sensor system is configured to measure characteristics of the samples of grain delivered to the sensor system by the sample conveyor system. In one or more arrangements, the system includes a cleaning system configured to clean the optical sensor, the lens; and/or other components of the sensor system. In one or more arrangements, the system includes a recalibration system configured to recalibrate the optical sensor.

38 Claims, 9 Drawing Sheets

(56) References Cited

U.S. PATENT DOCUMENTS

| | | | | |
|---|---|---|---|---|
| 5,152,516 A * | 10/1992 | Okayama | | B65H 7/14 |
| | | | | 271/265.01 |
| 5,331,792 A * | 7/1994 | Kitchen | | B65B 37/005 |
| | | | | 53/259 |
| 5,448,069 A * | 9/1995 | Tobler | | G01N 33/10 |
| | | | | 250/341.8 |
| 6,559,655 B1 * | 5/2003 | Rosenthal | | G01N 21/3563 |
| | | | | 250/252.1 |
| 6,749,810 B2 | 6/2004 | Carr | | |
| 6,845,326 B1 * | 1/2005 | Panigrahi | | A01D 41/1277 |
| | | | | 356/73.1 |
| D750,988 S | 3/2016 | Goldring | | |
| D751,435 S | 3/2016 | Goldring | | |
| 9,291,504 B2 | 3/2016 | Goldring | | |
| 9,377,396 B2 | 6/2016 | Goldring | | |
| 9,383,258 B2 | 7/2016 | Goldring | | |
| 9,500,523 B2 | 11/2016 | Goldring | | |
| 9,562,848 B2 | 2/2017 | Goldring | | |
| 9,574,942 B2 | 2/2017 | Goldring | | |
| 9,587,982 B2 | 3/2017 | Goldring | | |
| 9,933,305 B2 | 4/2018 | Goldring | | |
| 9,939,318 B2 | 4/2018 | Goldring | | |
| 9,952,098 B2 | 4/2018 | Goldring | | |
| 10,066,990 B2 | 9/2018 | Rosen | | |
| 10,203,246 B2 | 2/2019 | Rosen | | |
| 10,254,215 B2 | 4/2019 | Willk | | |
| 10,323,982 B2 | 6/2019 | Goldring | | |
| 10,330,531 B2 | 6/2019 | Goldring | | |
| 10,502,679 B2 | 12/2019 | Aphek | | |
| 10,641,657 B2 | 5/2020 | Goldring | | |
| 10,648,861 B2 | 5/2020 | Goldring | | |
| 10,704,954 B2 | 7/2020 | Goldring | | |
| 10,760,964 B2 | 9/2020 | Goldring | | |
| 10,791,933 B2 | 10/2020 | Goldring | | |
| 10,942,065 B2 | 3/2021 | Goldring | | |
| 11,067,443 B2 | 7/2021 | Goldring | | |
| 2005/0230225 A1 * | 10/2005 | Adams | | B65G 35/00 |
| | | | | 198/608 |
| 2006/0191251 A1 * | 8/2006 | Pirro | | A01F 29/09 |
| | | | | 56/60 |
| 2007/0153282 A1 * | 7/2007 | Zubkov | | G01N 21/0303 |
| | | | | 356/436 |
| 2008/0024760 A1 * | 1/2008 | Buehlmeier | | G01N 21/474 |
| | | | | 356/73 |
| 2009/0097019 A1 * | 4/2009 | Baker | | G01V 8/20 |
| | | | | 356/237.1 |
| 2015/0355083 A1 * | 12/2015 | Marbach | | G01N 21/3563 |
| | | | | 356/402 |
| 2017/0115211 A1 * | 4/2017 | Morimoto | | G01N 21/359 |
| 2017/0350825 A1 * | 12/2017 | Ishizuki | | B07C 5/3425 |
| 2019/0170727 A1 * | 6/2019 | Jensen | | G01N 33/48792 |
| 2020/0137959 A1 * | 5/2020 | Ricketts | | A01F 12/00 |
| 2020/0196532 A1 * | 6/2020 | Koch | | F26B 25/009 |

OTHER PUBLICATIONS

AGI SureTrack News Release—"AGI Suretrack Launches Fieldlab, Handheld Grain Analyzer"—https://www.agrimarketing.com/s/132825 Jan. 1, 2021.

Scio By Consumer Physics—"SCIO—The World's Only Pocket-Sized NIR Micro Spectrometer"—www.consumerphysics.com Jan. 1, 2021.

Texas Instruments—TIDA-00554 DLP NIRscan Nano EVM Stand-Off Head—Spectometer Jan. 1, 2021.

Viavi Solutions—MicroNIR Spectrometers—https://www.viavisolutions.com/en-us/osp/products/micronir-spectrometers Jan. 1, 2021.

Zeiss Corona Extreme—The most robust Spectrometer on the market—https://www.zeiss.com/spectroscopy/products/spectrometer-systems/corona-extreme.html#technical-data Jan. 1, 2021.

* cited by examiner

26

SYSTEM FOR EVALUATING GRAIN IN GRAIN HANDLING SYSTEMS

CROSS-REFERENCE TO RELATED APPLICATIONS

The present application claims priority to U.S. Provisional Application 63/243,264, titled SYSTEM FOR EVALUATING GRAIN IN GRAIN HANDLING SYSTEMS, and filed on Sep. 13, 2021, the entirety of which is hereby incorporated by reference herein, including any figures, tables, drawings, or other information.

FIELD OF THE DISCLOSURE

This disclosure relates to grain handling systems used in agriculture. More specifically and without limitation, this disclosure relates to a grain evaluation system for use with grain handling systems.

OVERVIEW

Since the development of harvesting technology that is capable of separating desired grains from the surrounding chaff, new technologies have been developed to handle bulk quantities of grain. Some various grain handling systems that have been developed include but are not limited to, for example, technologies for storage of bulk grain, such as grain bins; and/or technologies for drying grain, such as grain dryers; technologies for loading, unloading and/or otherwise moving grain, such as grain conveyors (e.g., bucket elevators, drag chains, belt systems augers, and/or air systems), sweep systems, and/or grain levelers to name a few.

Some example grain dryers are described in U.S. Pat. No. 10,767,926 titled "MIXED-FLOW GRAIN DRYER WITH CROSS-FLOW VACUUM COOL HEAT RECOVERY SYSTEM" and issued Sep. 8, 2020, and U.S. patent application Ser. No. 16/990,257 titled "BRIDGE REDUCING MIXED-FLOW GRAIN DRYER WITH CROSS-FLOW VACUUM COOL HEAT RECOVERY SYSTEM", filed on Aug. 22, 2020, and issued as U.S. Pat. No. 11,193,711 on Dec. 7, 2021, each of which is hereby fully incorporated by reference herein. Some example grain conveyors are described in U.S. patent application Ser. No. 17/194,413 titled "SINGLE DRIVE DUAL HOPPER CONVEYOR SYSTEM", filed Mar. 8, 2021, and published as U.S. Patent Publication 2021/0284469 on Sep. 16, 2021, U.S. Patent Publication 2020/0196532 titled "AIR SYSTEM", published Jun. 25, 2020, and U.S. patent application Ser. No. 16/997,333 titled "SWEEP SYSTEM FOR FULL ELEVATED FLOOR GRAIN BINS" filed Aug. 19, 2020, and published as U.S. Patent Publication 2021/0051856 on Feb. 25, 2021, each of which is hereby fully incorporated by reference herein. Some example grain bins are described in U.S. patent application Ser. No. 17/346,373 titled "SELF-OPENING AIRTIGHT ROOF VENT SYSTEM FOR GRAIN STORAGE DEVICES" filed Jun. 14, 2021, and published as U.S. Patent Publication 2021/0392820 on Dec. 23, 2021, and U.S. Pat. No. 10,407,935 titled "DOUBLE END STUD BOLT AND METHOD OF USE" and issued Sep. 10, 2019, each of which is hereby fully incorporated by reference herein.

For simplicity purposes, reference is made herein to grain. However, the disclosure is not intended to be limited to grain. Instead, the disclosure is intended to apply to corn, soybeans, wheat, rice, nuts, popcorn, pistachios, small grains, large grains, unprocessed grains, processed grains, foodstuffs, unprocessed foodstuffs, processed foodstuffs, other commodities, or any other grain or agricultural products or other flowable material. As such, unless specifically stated otherwise, reference to grain is intended to include all forms of corn, soybeans, wheat, rice, nuts, popcorn, pistachios, small grains, large grains, unprocessed grains, processed grains, foodstuffs, unprocessed foodstuffs, processed foodstuffs, other commodities, or any other grain or agricultural products or other material.

Grain bins are often used to store grain for long periods of time. To ensure the stability of bulk grain during long-term storage the temperature and/or moisture level of the grain is closely monitored and controlled. More grain is damaged by improper storage conditions than for any other reason. The most common problems are: inadequate observation of grain during storage, (e.g., not checking grain frequently, improper grain management (e.g., not using aeration to control grain temperature), pockets of fines (broken kernels, weed seeds, and debris) restricting airflow and providing food for insects and mold, grain deteriorating because it was held too long without adequate aeration prior to drying, improper cooling of grain after drying, poor initial grain quality or insufficient drying to safe moisture content, freezing of grain, and/or improper or lack of insect control.

To ensure that grain is properly processed, transported, stored, and marketed to receive optimal price, it is desirable to sample grain and assess quality and/or conditions at various points between harvesting and sale.

Therefore, for all the reasons stated above, and the reasons stated below, there is a need in the art for an improved system for evaluating grain in grain handling systems.

Thus, it is a primary object of the disclosure to provide a grain evaluation system for grain handling systems that improves upon the state of the art.

Another object of the disclosure is to provide a grain evaluation system that permits real-time monitoring of grain in grain handling systems.

Yet another object of the disclosure is to provide a grain evaluation system that is able to sample and evaluate grain in grain handling systems.

Another object of the disclosure is to provide a grain evaluation system having an optical sensor for evaluating grain in grain handling systems.

Yet another object of the disclosure is to provide a grain evaluation system having an infrared (or near infrared) optical sensor for evaluating grain in grain handling systems.

Another object of the disclosure is to provide a grain evaluation system configured to perform optical spectrometry on samples of grain.

Yet another object of the disclosure is to provide a grain evaluation system capable of self calibration.

Another object of the disclosure is to provide a grain evaluation system capable of self-cleaning.

Yet another object of the disclosure is to provide a grain evaluation system that is easy to manufacture.

Another object of the disclosure is to provide a grain evaluation system that is durable.

Yet another object of the disclosure is to provide a grain evaluation system that has a robust design.

Another object of the disclosure is to provide a grain evaluation system that is relatively inexpensive.

Yet another object of the disclosure is to provide a grain evaluation system that is high quality.

Another object of the disclosure is to provide a grain evaluation system that can be used with any grain handling system.

These and other objects, features, or advantages of the disclosure will become apparent from the specification, figures, and claims.

SUMMARY OF THE DISCLOSURE

In one or more arrangements, a system for evaluating grain in a grain handling system is provided. In one or more arrangements, the system includes a sensor system and a sample conveyor system among other components. In one or more arrangements, the sensor system is operatively connected to the grain handling system and includes an optical sensor. In one or more arrangements, the sample conveyor system is operatively connected to the sensor system and is configured to collect samples of grain in the grain handling system, deliver the samples of grain to the sensor system, and remove the samples of grain from the sensor system. The sensor system is configured to measure one or more characteristics of the samples of grain delivered to the sensor system by the sample conveyor system.

In one or more arrangements, the optical sensor is an infrared sensor and the sensor system includes an infrared light. In one or more arrangements, the optical sensor has a lens. In one or more arrangements, the system includes a cleaning system configured to clean the optical sensor, the lens, and/or one or more other components of the sensor system. In one or more arrangements, the system includes a recalibration system configured to recalibrate the optical sensor.

In one or more arrangements, the sample conveyor system includes a sample collector and a conveyor. The sample collector is configured to collect the samples of grain in the grain handling system. The conveyor is configured to receive the samples of grain from the sample collector, deliver the samples of grain to the sensor system, and remove the samples of grain from the sensor system. In one or more arrangements, the conveyor is a turntable type conveyor configured to transport the samples of grain when rotated.

DETAILED DESCRIPTION OF THE DISCLOSURE

Figure 1:
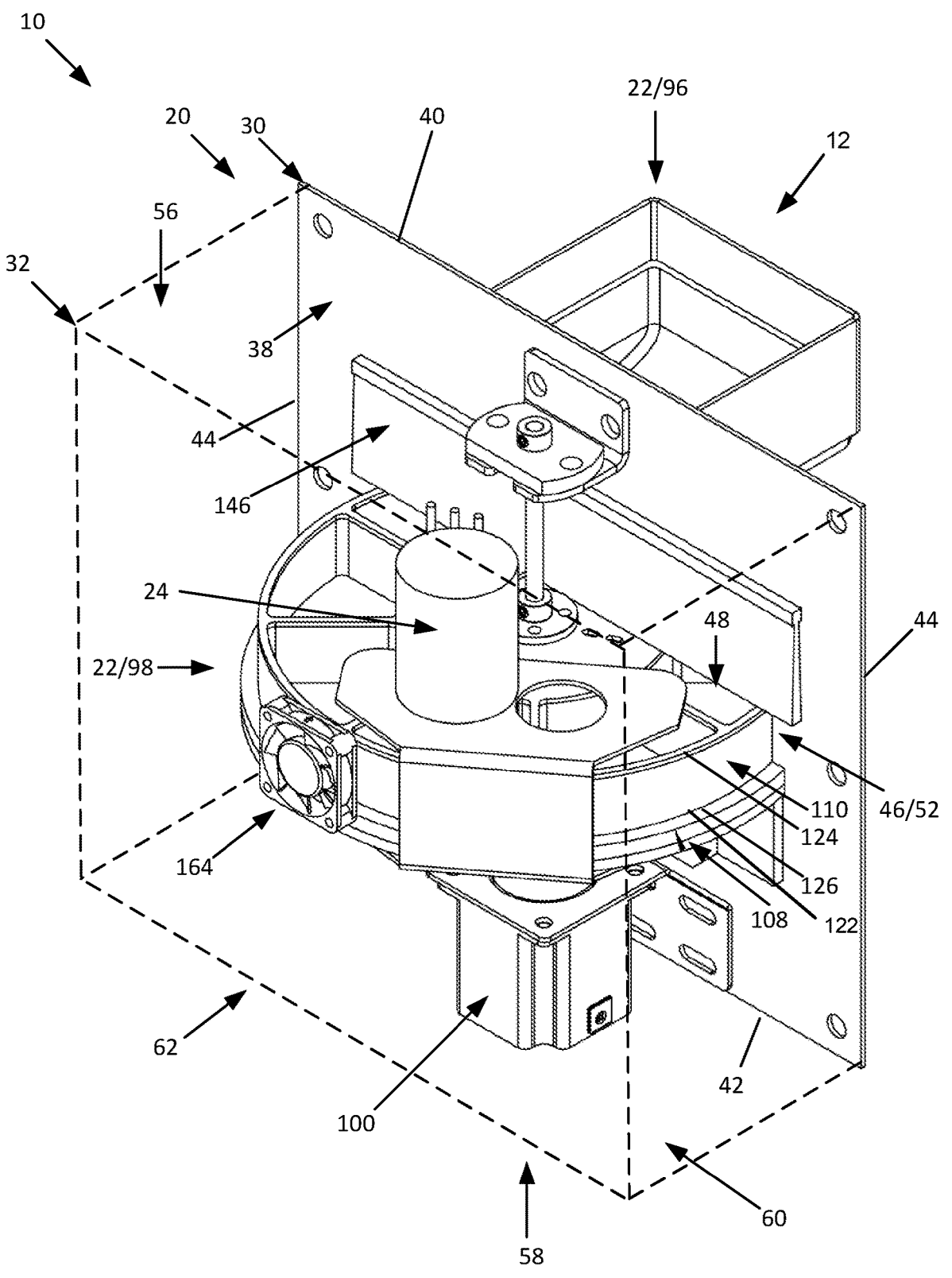
FIG. 1 shows an upper, rear, right side perspective view of a grain evaluation system, in accordance with one or more arrangements; the view showing the system having a housing with a transparent back cover; the view showing a front cover of system omitted.
Figure 2:
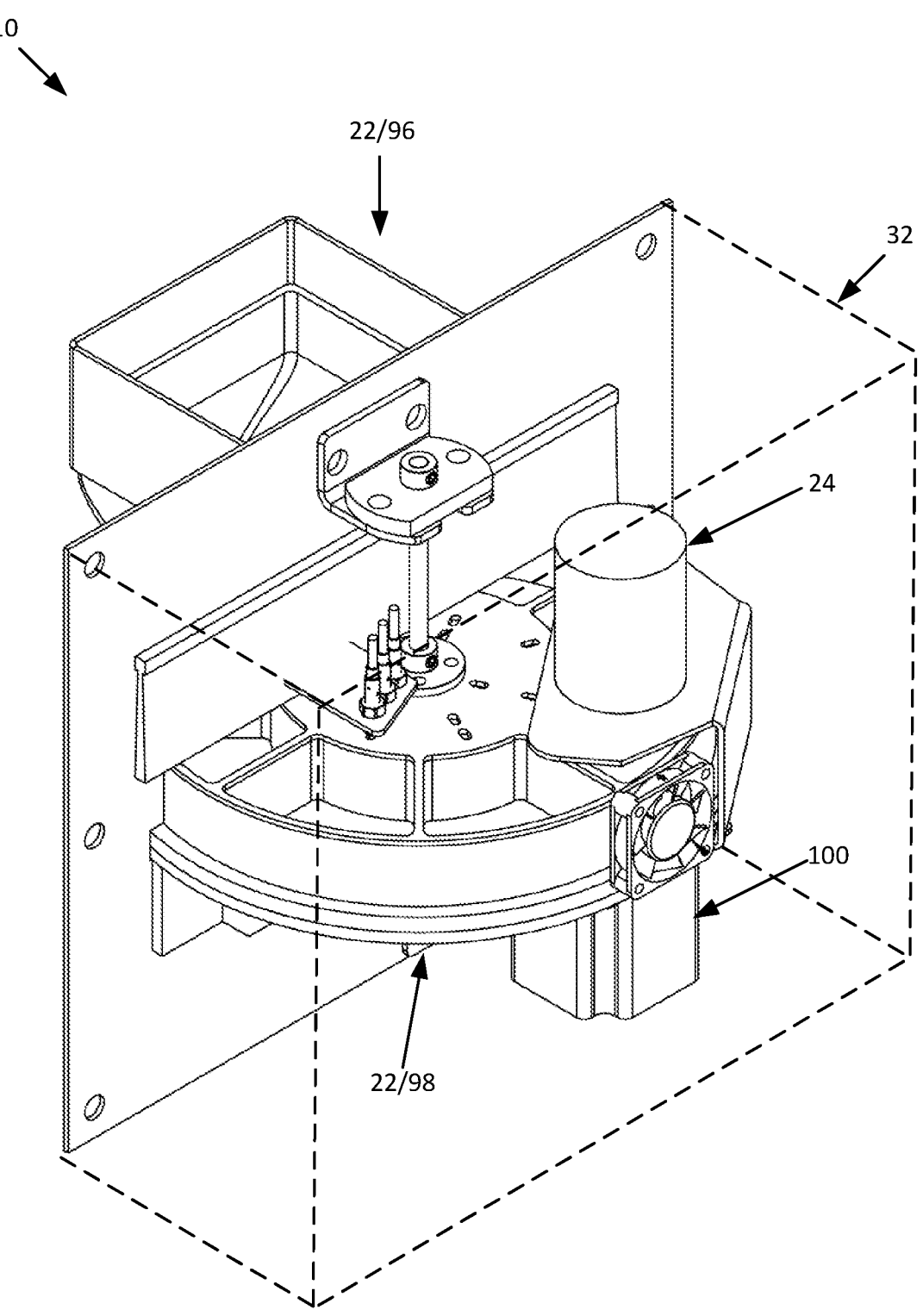
FIG. 2 shows an upper, rear, left side perspective view of a grain evaluation system, in accordance with one or more arrangements; the view showing the system having a housing with a transparent back cover; the view showing a front cover of system omitted.
Figure 3:
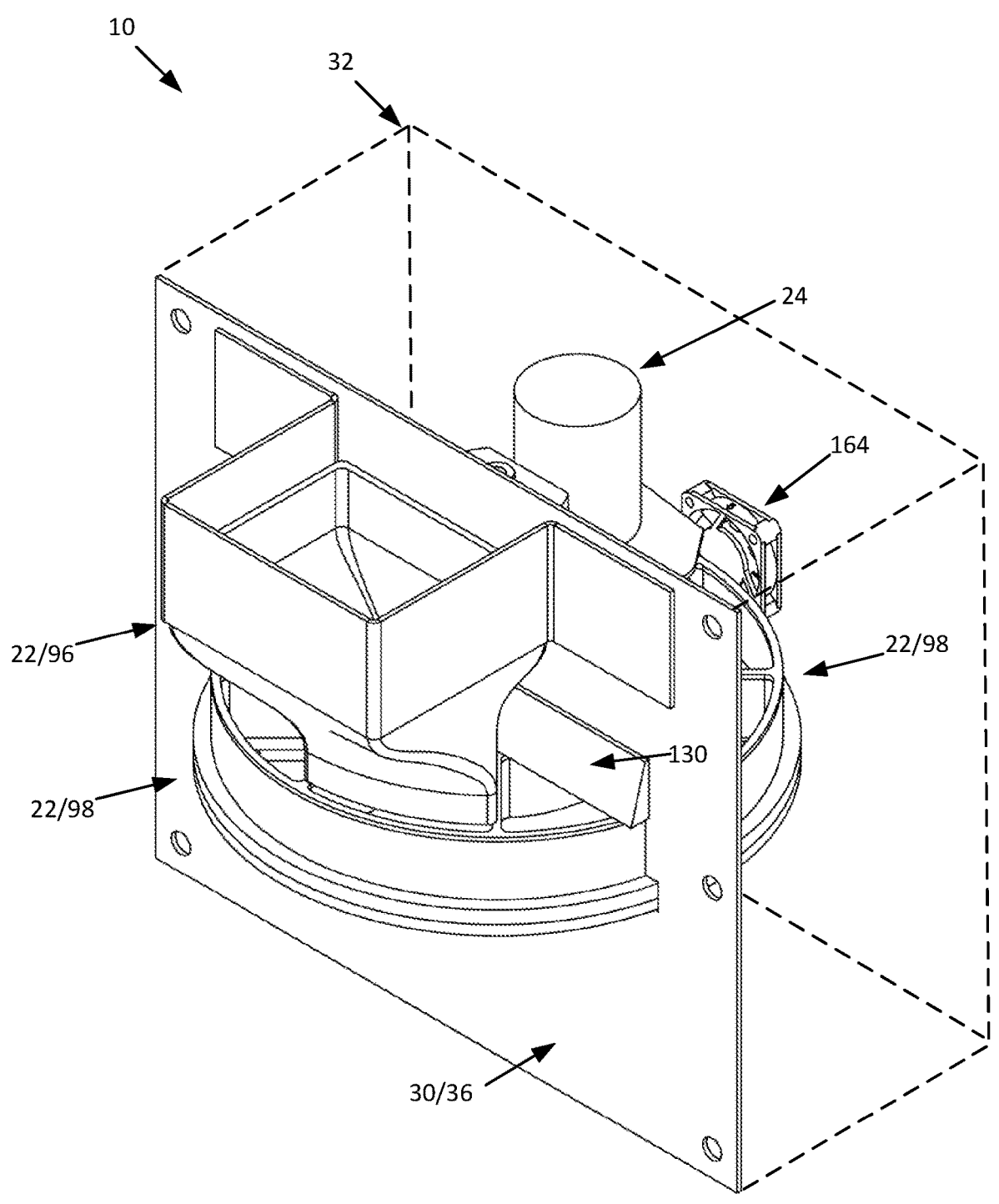
FIG. 3 shows an upper, front, left side perspective view of a grain evaluation system, in accordance with one or more arrangements; the view showing the system having a housing with a transparent back cover; the view showing a front cover of system omitted.
Figure 4:
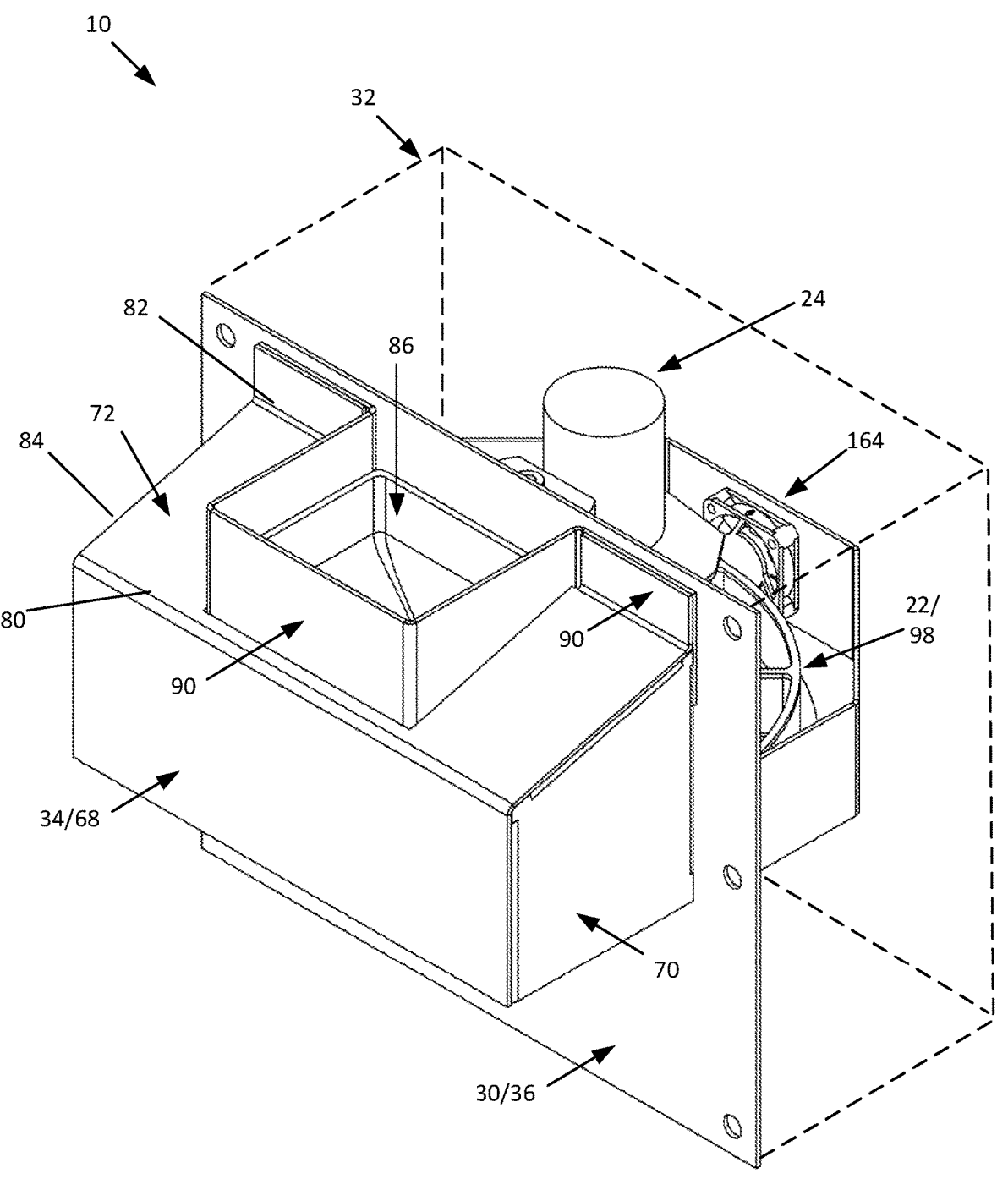
FIG. 4 shows an upper, front, left side perspective view of a grain evaluation system, in accordance with one or more arrangements; the view showing the system having a housing with a transparent back cover.
Figure 5:
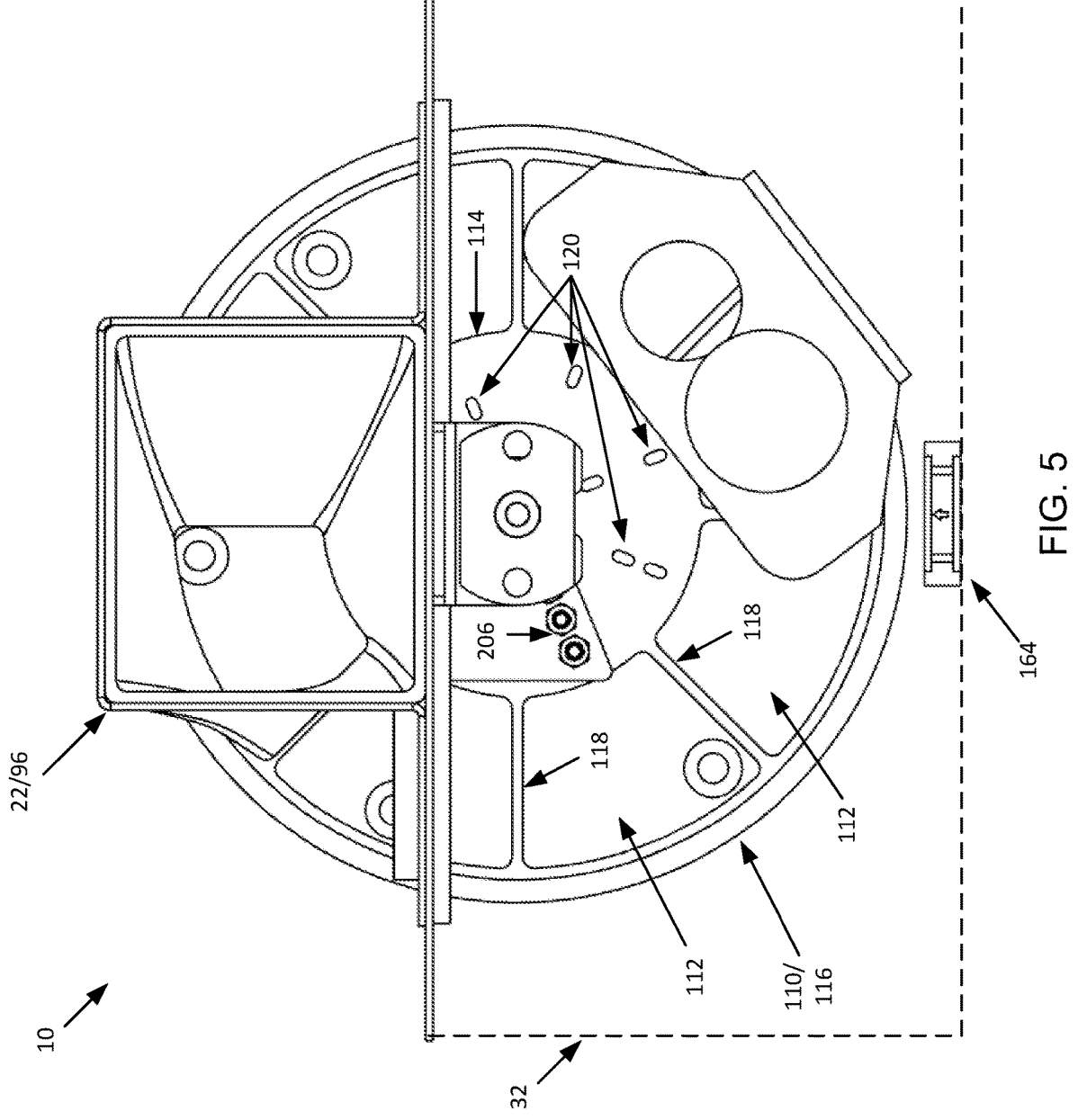
FIG. 5 shows a top view of a grain evaluation system, in accordance with one or more arrangements; the view showing the system having a housing with a transparent back cover; the view showing a front cover of system omitted.
Figure 6:
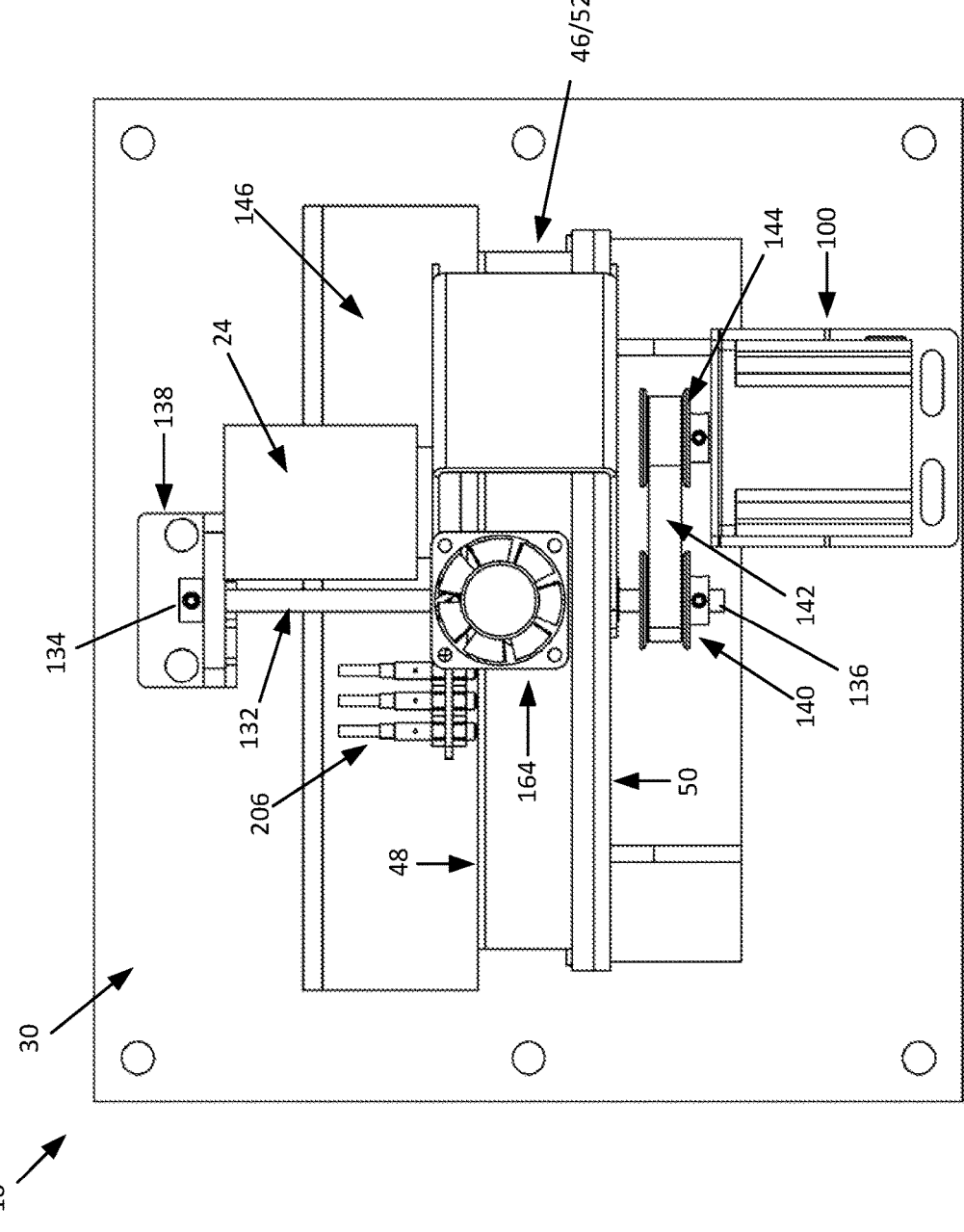
FIG. 6 shows a rear view of a grain evaluation system, in accordance with one or more arrangements; the view showing the system having a housing with a back cover omitted.
Figure 7:
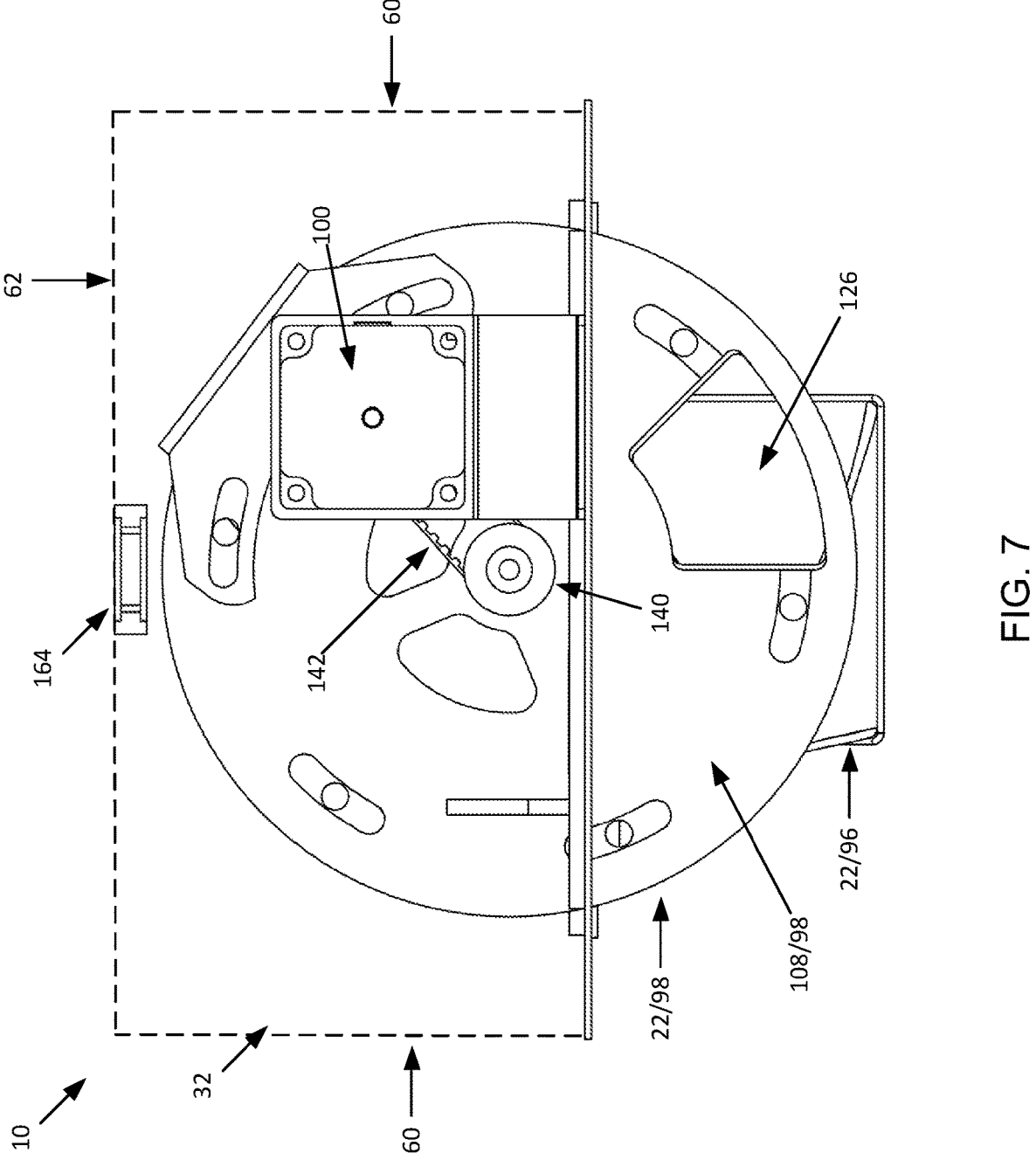
FIG. 7 shows a bottom view of a grain evaluation system, in accordance with one or more arrangements; the view showing the system having a housing with a transparent back cover; the view showing a front cover of system omitted.
Figure 8:
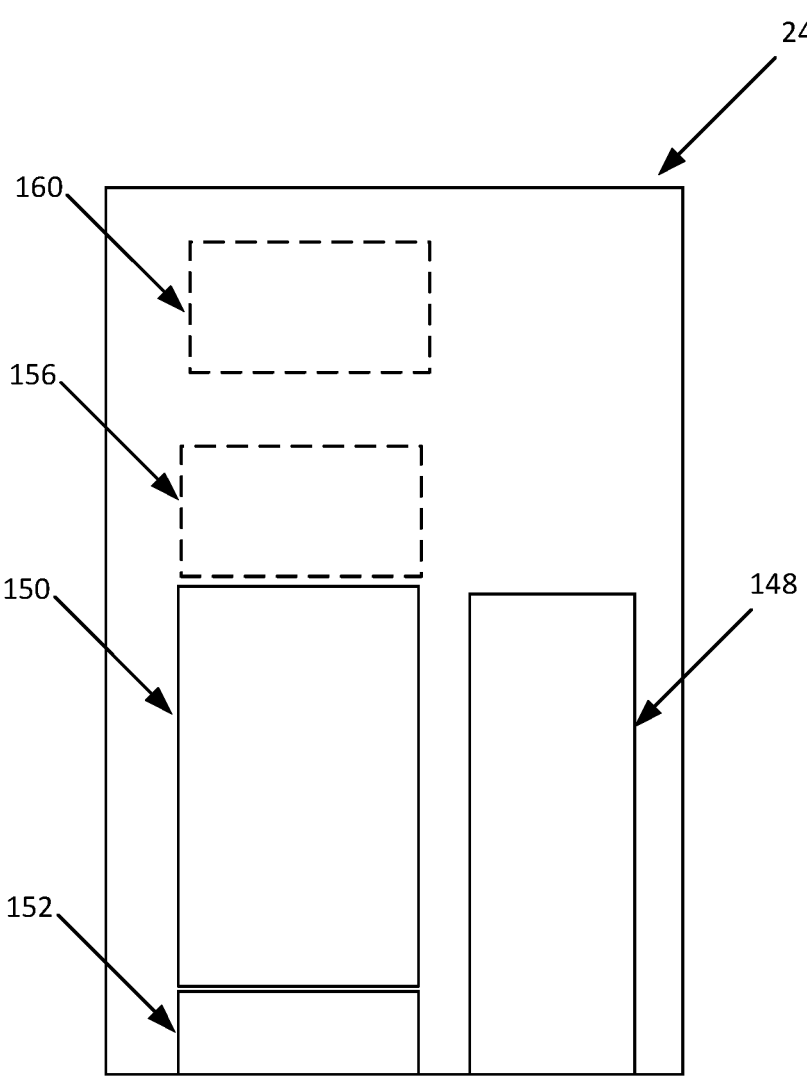
FIG. 8 shows an example sensor system for use in a grain evaluation system, in accordance with one or more arrangements.
Figure 9:
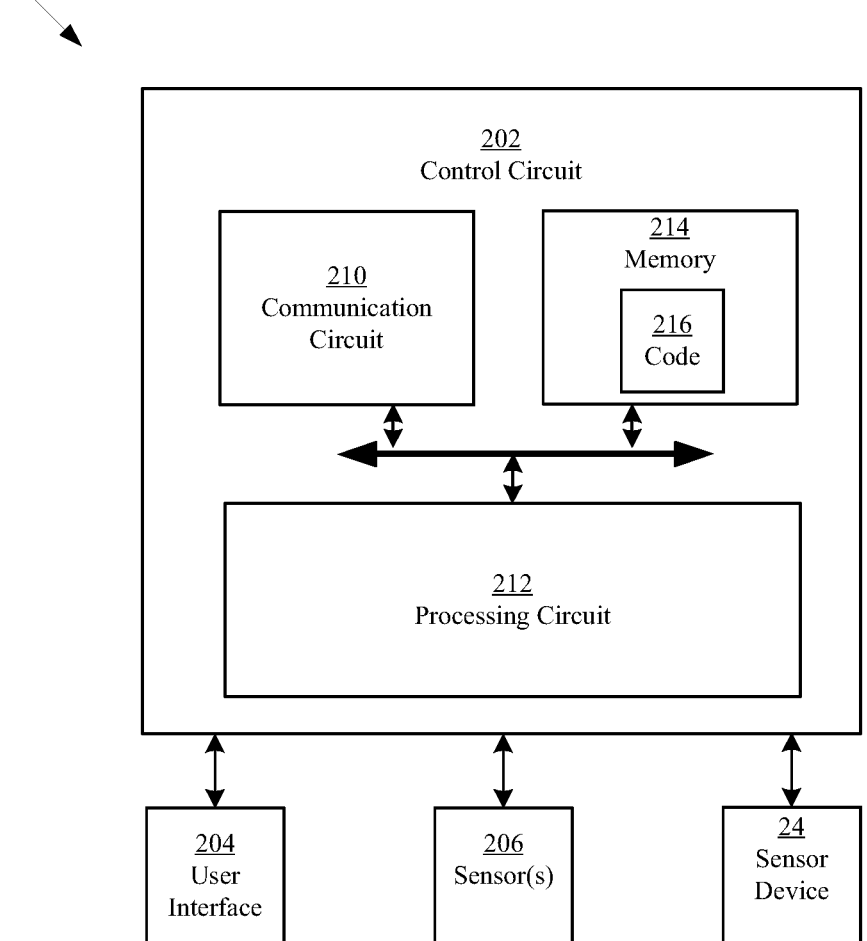
FIG. 9 shows an example control circuit for use in a grain evaluation system, in accordance with one or more arrangements.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in and/or described with reference to certain figures and/or embodiments, it will be appreciated that features from one figure and/or embodiment may be combined with features of another figure and/or embodiment even though the combination is not explicitly shown and/or explicitly described as a combination. In the depicted embodiments, like reference numbers refer to like elements throughout the various drawings.

It should be understood that any advantages and/or improvements discussed herein may not be provided by various disclosed embodiments, and/or implementations thereof. The contemplated embodiments are not so limited and should not be interpreted as being restricted to embodiments that provide such advantages and/or improvements. Similarly, it should be understood that various embodiments may not address all or any objects of the disclosure and/or objects of the invention that may be described herein. The contemplated embodiments are not so limited and should not be interpreted as being restricted to embodiments that address such objects of the disclosure and/or invention. Furthermore, although some disclosed embodiments may be described relative to specific materials, embodiments are not limited to the specific materials and/or apparatuses but only to their specific characteristics and capabilities and other materials and apparatuses can be substituted as is well understood by those skilled in the art in view of the present disclosure. Moreover, although some disclosed embodiments may be described in the context of window treatments, the embodiments are not so limited. In is appreciated that the embodiments may be adapted for use in other applications which may be improved by the disclosed structures, arrangements and/or methods.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation and/or configuration.

As used herein, "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments and/or methods.

Similarly, the structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually, and/or sequentially, to provide looping and/or other series of operations aside from single operations described below. It should be presumed that any embodiment and/or method having features and functionality described below, in any workable combination, falls within the scope of example embodiments.

As used herein, various disclosed embodiments may be primarily described in the context of grain handling system. However, the embodiments are not so limited. It is appreciated that the embodiments may be adapted for use in other applications which may be improved by the disclosed structures, arrangements and/or methods. The system is merely shown and described as being used in the context of grain handling systems for ease of description and as one of countless example applications.

System 10:

Turning now to the figures, a grain evaluation system 10 (or simply system 10) is presented for evaluating grain in a grain handling system 12, as is shown as one example. In the arrangement shown, as one example, grain evaluation system 10 includes a housing 20, a sample conveyor system 22, a sensor system 24, and a control system 26, among other components.

Housing 20

Housing 20 is formed of any suitable size, shape, and design and is configured to house and interconnect sample conveyor system 22, sensor system 24, and/or other components of system 10. In the arrangement shown, as one example, housing 20 includes a center plate 30, a back cover 32, and a front cover 34.

Center Plate 30

Center plate 30 is formed of any suitable size, shape, and design and is configured to interconnect sample conveyor system 22 and sensor system 24, and provide an opening to facilitate transportation of samples into and out of system 10. In the arrangement shown, center plate 30 has a generally planar rectangular shaped front surface 36 and rear surface 38 extending between a top edge 40, a bottom edge 42, and opposing side edges 44. In this example arrangement, center plate 30 has an opening 46 to facilitate transportation of samples into and out of system 10. In this example arrangement, opening 46 has a generally rectangular shape extending between an upper inner edge 48, a lower inner edge 50, and opposing side inner edges 52.

Back Cover 32:

Back cover 32 is formed of any suitable size, shape, and design and is configured to connect with rear surface 38 of center plate 30 to form an enclosure for housing sensor system 24, sample conveyor system 22, and/or other components of system 10. In the arrangement shown, back cover 32 has a generally rectangular shape having a top 56, a bottom 58, opposing sides 60, and a back 62.

Front Cover 34:

Front cover 34 is formed of any suitable size, shape, and design and is configured to connect with front surface 36 of center plate 30 and cover the portion of sample conveyor system 22 that extends through opening 46 of center plate 30. In the arrangement shown, front cover 34 has a generally rectangular shaped front 68 with opposing sides 70 and a sloped top 72. Sloped top 72 extends rearward from the front 68 of the front cover 34 to the rearward edges where front cover 34 connects with center plate 30. In this example arrangement, sloped top 72 has a generally rectangular shape extending between a front edge 80, a rear edge 82, and side edges 84 with a rectangular cutaway 86 extending forward from rear edge 82. Cutaway 86 is configured to permit sloped top 72 to fit around sample collector 96 of sample conveyor system 22 to facilitate collection of samples. In this example arrangement, front cover 34 also has flanges 90 that extend upward from rear edge 82 of sloped top 72 and from the edges of cutaway 86.

Sample Conveyor System 22

Sample conveyor system 22 is formed of any suitable size, shape, and design and is configured to collect samples, transport samples to sensor system 24 for evaluation, and remove samples from system 10 following evaluation. In the arrangement shown, as one example, sample conveyor system 22 has a sample collector 96, a conveyor 98, and a motor 100, among other components.

Sample Collector 96:

Sample collector 96 is formed of any suitable size, shape, and design and is configured to collect samples of grain from grain handling system 12 and provide collected samples to conveyor 98. In the arrangement shown, sample collector 96 is a funnel configured to catch falling grain at an opening proximate to cutaway 86 and guide the grain to an input of conveyor 98. However, the embodiments are not so limited. Rather, it is contemplated that in some various different arrangements, sample collector 96 may collect samples using various methods or means including but not limited to, for example: funnels, chutes, tubes, probes, shovels, arms, claws, scoops, ladles, dippers, buckets, baskets, belts, augers, drag chains, blowers, siphons, droppers, and/or any other methods or means for collecting samples.

Conveyor 98:

Conveyor 98 is formed of any suitable size, shape, and design and is configured to receive samples of grain from sample collector 96, transport the samples to sensor system 24 for evaluation, and remove samples from system 10 following evaluation. In the arrangement shown, conveyor 98 is a turntable type conveyor having a stationary bottom 108, and a rotating sample tray 110

Stationary bottom 108 is formed of any suitable size, shape, and design and is configured to hold samples within partitions 112 of sample tray 110 as samples are transported to sensor system 24. Stationary bottom 108 is also configured to facilitate removal of samples from partitions 112 of sample tray 110 after the samples have been transported out of sensor system 24. In this example arrangement, stationary bottom 108 has a generally planar cylindrical shape and is positioned within opening 46 proximate to lower inner edge 50. In this example arrangement, stationary bottom 108 has an opening 126 positioned forward of center plate 30 to facilitate removal of samples from partitions 112.

Sample tray 110 is formed of any suitable size, shape, and design and is configured to slide samples along stationary bottom 108 within respective partitions 112 of sample tray 110 when rotated. In the arrangement shown, as one example, sample tray 110 has a central hub 114, a cylindrical shaped outer wall 116, and a set of partition walls 118 extending outward from central hub 114 to outer wall 116. In this example arrangement, central hub 114, outer wall 116, and partition walls 118 extend upward from lower edges 122 to upper edges 124. In this example arrangement, each partition 112 of sample tray 110 is bounded by an inner wall formed by central hub 114, two of the partition walls 118, and outer wall 116.

In this example arrangement, an axel 132 extends through a center of sample tray 110 and stationary bottom 108 of conveyor 98. Axel 132 is formed of any suitable size, shape, and design and is configured to operably connect with and facilitate rotation of sample tray 110. In this example arrangement, axel 132 has an elongated cylindrical shape extending from an upper end 134, where axel 132 is connected to center plate 30 of housing 20 by a bracket 138, to a lower end 136 where axel 132 is connected to a first pulley 140.

In one or more arrangements, system 10 includes one or more seals 146 configured to seal gap(s) in opening 46 between sample tray 110 of conveyor 98 and inner edges 48, 50, and 52 of center plate 30. In the arrangement shown, as one example, system 10 includes a brush type seal 146 configured to seal a gap in opening 46 between an upper edge 124 of sample tray 110 of conveyor 98 and upper inner edge 48 of center plate 30. However, the embodiments are not so limited. Rather, it is contemplated that in some various arrangements, seals 146 may be implemented using various methods and means for providing a seal, including but not limited to, for example, brush seals, foam seals, rubber seals, and/or any other methods or means for sealing.

Conveyor Process:

In this example arrangement, sample collector 96 is positioned above sample tray 110 of conveyor 98 to deposit samples in partitions 112 as the partitions 112 are moved under sample collector 96. As sample tray 110 is rotated counter-clockwise, the sample slides along stationary bottom 108 within partitions 112 and in through opening 46 in center plate 30. In this example, conveyor 98 includes a level striker 130 configured to level off the top of the sample as partitions 112 are moved through opening 46 in center plate 30.

As rotation of sample tray 110 continues, the sample in the partition 112 is moved in close proximity to sensor system 24 for evaluation. In this example arrangement, the sample is moved under sensor system 24 for evaluation. However, the arrangements are not so limited. Rather, it is contemplated that in one or more arrangements, sensor system 24 may be configured to take sensor measurements in any position and/or orientation relative to the sample including but not limited to, above the sample, below the sample, to the side of the sample, and/or any other position and/or orientation.

In one or more arrangements, sensor system 24 and/or sample conveyor system 22 is configured to place optical sensor 150 and/or lens 152 of sensor system 24 in close proximity to and/or direct contact with the samples of grain for evaluation. Due to sometimes irregular shape of grain and/or inconsistent settling, placement of optical sensor 150 and/or lens 152 of sensor system 24 in close proximity to the samples of grain may help promote consistency and accuracy of measurements.

When sensor system 24 has completed measurements of a sample, sample tray 110 is rotated to remove the sample from the system 10. In this example arrangement, as sample tray 110 is rotated, sample tray 110 slides the sample along stationary bottom 108 within the partition 112 and back out through opening 46 in center plate 30. When the partition 112 reaches opening 126 in stationary bottom 108, the sample falls through opening 126, thereby removing the sample from system 10. As rotation of sample tray 110 continues, the partition is moved back under sample collector 96 where partition 112 receives another sample and the process is repeated.

While the arrangements may be primarily described with reference to conveyor 98 being a turntable type conveyor, the embodiments are not so limited. Rather, it is contemplated that in some various different arrangements, conveyor 98 may be configured to transport samples using various methods or means including but not limited to, for example: funnels, chutes, tubes, probes, shovels, arms, claws, scoops, ladles, dippers, buckets, baskets, belts, augers, drag chains, blowers, siphons, droppers, and/or any other methods or means for transporting samples.

Motor 100:

Motor 100 is formed of any suitable size, shape, and design and is configured to generate mechanical movement. In the arrangement shown, as one example, motor 100 is an electric motor configured to convert electric power into rotational motion. In the arrangement shown, motor 100 is a stepper motor. However, the arrangements are not so limited. Rather, it is contemplated that, in some various arrangements, motor 100 may be any type of electric motor including but not limited to, for example: DC shunt motors, separately excited motors, series motors, PCDC motors, compound motors, induction motors, synchronous motors, stepper motors, brushless motors, hysteresis motors, reluctance motors, universal motors, and/or any other type of electric motor. While the arrangements are primarily discussed with reference to motor 100 being an electric motor, the embodiments are not so limited. For example, in some various arrangements, motor 100 is an internal combustion engine, a fluid driven engine (e.g., steam, water, and/or air driven), or any other type of motor or engine.

In this example arrangement, motor 100 is operably connected to conveyor 98 by a belt 142 extending between the first pulley 140, connected to lower end 136 of axel, and a second pulley 144 connected to an output shaft of motor 100. However, the embodiments are not so limited. Rather, it is contemplated that motor 100 may be operably connected to conveyor 98 by any means or methods including but not limited to, for example, belts, chains, gears, or any other methods or means. It is also contemplated that in one or more arrangements, an output shaft of motor 100 may be connected directly to axel 132 and/or to sample tray 110 of conveyor 98.

Sensor System 24:

Sensor system 24 is formed of any suitable size, shape, and design and is configured to sense, measure, and/or detect one more characteristics of grain samples using one or more sensors. In the arrangement shown, sensor system 24 includes a light 148, an optical sensor 150 and a lens 152. However, the embodiments are not so limited. Rather, it is contemplated that in one or more arrangements, sensor system 24 may include any type and/or any number of sensors including but not limited to, for example: optical sensors, temperature sensors, moisture sensors, particulate sensors, chemical sensors, light sensors, positional sensors, geolocation sensors, and/or any other type of sensor.

In one or more arrangements, sensor system 24 and/or control system 26 is configured to derive various data metrics relating to qualities of grain samples from data provided by optical sensor 150. In one or more arrangements, sensor system 24 and/or control system 26 is an optical spectrometer configured to perform infrared (or near infrared) optical spectrometry by evaluating the spectrum of light detected by optical sensor 150 to; assess atomic absorption of light by a sample, light emitted or fluoresced by the sample, and/or light scattered by the sample; and to determine molecular components including but not limited to, for example, moisture content or nutritional properties of the sample (e.g. protein content, oil content, starch content, sugar content, and the like). Additionally, or alternatively, in one or more arrangements, sensor system 24 and/or control system 26 may be configured to derive various other measurements from the optical sensor 150 data, including but not limited to, for example, temperature, density, and/or various other measurements.

Additionally, or alternatively, in one or more arrangements, sensor system 24 and/or control system 26 may be configured to apply one or more object recognition algorithms to images captured by optical sensor 150 to identify fines and other contaminants, cracked or otherwise damaged hulls, and/or other visible properties of grain.

Cleaning System 156:

In one or more arrangements, sensor system 24 includes a cleaning system 156 configured to clean optical sensor 150, lens 152, other sensors or components of sensor system 24 and/or system 10 (e.g., to remove dust or debris left by previous samples). As an illustrative example, in one or more arrangements, cleaning system 156 is configured to automatically clean optical sensor 150 and/or lens 152 at one or more various different times (e.g., when system 10 is powered on, when system 10 is powering down, before a sample is evaluated by sensor system 24, after a sample is evaluated by sensor system 24, and/or periodically (e.g., hourly, daily weekly, monthly, and/or yearly)).

In some various different arrangements, cleaning system 156 may utilize any method and means for automated cleaning including but not limited to, for example: blowers, motorized brushes, wipers, vibrators (e.g., ultrasonic vibrators positioned on optical sensor 150, lens 152, and/or filters covering optical sensor 150 and/or lens 152), actuators, and/or devices configured to repel dust and debris by generating an electric charge.

Calibration System 160:

In one or more arrangements, sensor system 24 includes a calibration system 160 configured to calibrate optical sensor 150 and/or other sensors of sensor system 24. As an illustrative example, in one or more arrangements, calibration system 160 is configured to automatically calibrate optical sensor 150 at one or more various different times (e.g., when system 10 is powered on, when system 10 is powering down, before a sample is evaluated by sensor system 24, after a sample is evaluated by sensor system 24 and/or periodically (e.g., hourly, daily weekly, monthly, and/or yearly)).

In some various different arrangements, calibration system 160 may utilize any known methods or means for calibrating sensors. As an illustrative example, in some arrangements, calibration system 160 is configured to use sensor system 24 to capture one or more reference images to recalibrate optical sensor 150 to an expected output. For instance, in one or more arrangements, calibration system 160 is configured to cause optical sensor 150 of sensor system 24 to capture an image of a white reference frame and a black reference frame. For instance, in one or more arrangements, calibration system 160 may be configured to move a white background into the optical path of optical sensor 150, illuminate the background with light 148 to facilitate capture a white reference frame, and then turn off light 148 to facilitate capture of a black reference frame. In some arrangements, calibration system 160 is configured to adjust one or more settings of optical sensor 150 and/or sensor system to correct for any differences between the captured reference frames and expected output. Additionally, or alternatively, calibration system 160 may provide captured reference frames with sensor data gathered from evaluation of samples for analysis by control system 26 and/or another device communicatively connected to system 10.

In one or more arrangements, calibration system 160 may additionally or alternatively adjust calibration of optical sensor 150 or other sensors 206 based on environmental conditions (e.g., temperature, humidity, etc) that may affect readings of any temperature sensitive components. As an illustrative example, in one or more arrangements, calibration system 160 may measure temperature of a temperature sensitive component of sensor system 24 prior to evaluating a sample. In one or more arrangements, calibration system 160 may determine an amount to bias sensor readings of the temperature sensitive component from a table stored in a memory. The calibration system 160 may then adjust calibration of the temperature sensitive components based on the determined amount of bias.

However, the embodiments are not limited to calibrations described with reference to these illustrative examples. Rather, it is contemplated that in some various different arrangements, calibration system 160 may calibrate optical sensor 150, sensors 206, or other components of system 10 using any known method or means for calibration.

Environmental Control System 164:

In one or more arrangements, system 10 includes an environmental control system 164. Environmental control system 164 is formed of any suitable size, shape, or design, and is configured to facilitate heating and/or cooling of sensor system 24, motor 100, control system 26, and/or other components of system 10 during operation. For example, in one or more arrangements, environmental control system 164 is configured to heat and/or cool sensor system 24 as required to ensure that the components of sensor system 24 are operated in a fairly consistent temperature range to help prevent temperature fluctuations from skewing readings.

In the arrangement shown, as one example, environmental control system 164 includes a fan connected to housing 20 to facilitate circulation of hot, cold, or ambient air into the hollow interior of or the environmental chamber of sample conveyor system 22. However, the arrangements are not so limited. Rather, it is contemplated that in one or more arrangements, environmental control system 164 may be implemented with any means or methods for heating, cooling, providing positive airflow, providing negative airflow and/or other environmental control including but not limited to, for example, fans, heat sinks, thermoelectric cooling elements (such as Peltier cooling elements), liquid cooling elements, heating elements, heat pumps, humidifiers, dehumidifiers, or any other means or method for heating, cooling, and/or other environmental control.

In one arrangement, environmental control system 164 includes a fan that either provides a source of clean air flow to the hollow interior or environmental chamber of environmental control system 164. Grain tends to be very dirty with what is known as fines mixed into the gain. Fines is dust and debris that is mixed in with the grain. The fines mixed in with grain can provide complexities when preforming an optical measurement of the grain, as the fines can make lens 152 dirty, which can impact the accuracy of the measurement. In one arrangement, providing a positive (or negative) source of clean air can act to suppress or drive away the fines thereby helping to facilitate a cleaner system 10 with improved accuracy. A positive airflow from the fan of environmental control system 164 can help to suppress dust thereby keeping lens 152 clean and clear for longer.

Control System 26:

In one or more arrangements, system 10 includes a control system 26. Control system 26 is formed of any suitable size, shape, and design and is configured to control operation of sample collector 96, conveyor 98, sensor system 24 and/or other components of system 10 to facilitate evaluation of grain samples. In the arrangement shown, as one example, control system 26 includes a control circuit 202, user interface 204, and/or sensors 206, among other components.

Control Circuit 202:

Control circuit 202 is formed of any suitable size, shape, design and is configured to control operation of sample collector 96, conveyor 98, sensor system 24 and/or other components of system 10 to facilitate evaluation of grain samples in response to signals of sensors 206/150 and/or input from user interface 204. In the arrangement shown, as one example implementation, control circuit 202 includes a communication circuit 210, a processing circuit 212, and a memory 214 having software code 216 or instructions that facilitate the operation of system 10.

Processing Circuit 212:

Processing circuit 212 may be any computing device that receives and processes information and outputs commands according to software code 216 stored in memory 214. For example, in some various arrangements, processing circuit 212 may be discreet logic circuits or programmable logic circuits configured for implementing these operations/activities, as shown in the figures and/or described in the specification. In certain arrangements, such a programmable circuit may include one or more programmable integrated circuits (e.g., field programmable gate arrays and/or programmable ICs). Additionally, or alternatively, such a programmable circuit may include one or more processing circuits (e.g., a computer, microcontroller, system-on-chip, smart phone, server, and/or cloud computing resources). For instance, computer processing circuits may be programmed to execute a set (or sets) of software code stored in and accessible from memory 214.

Memory 214:

Memory 214 may be any form of information storage such as flash memory, ram memory, dram memory, a hard drive, or any other form of memory. Processing circuit 212 and memory 214 may be formed of a single combined unit. Alternatively, processing circuit 212 and memory 214 may be formed of separate but electrically connected components. Alternatively, processing circuit 212 and memory 214 may each be formed of multiple separate but communicatively connected components.

Software code 216 is any form of instructions or rules that direct processing circuit 212 how to receive, interpret and respond to information to operate as described herein. Software code 216 or instructions is stored in memory 214 and accessible to processing circuit 212. As an illustrative example, in one or more arrangements, software code 216 or instructions may configure processing circuit 212 and control circuit 202 to monitor sensors 206/150 to facilitate control of various components of system 10 and/or grain handling system(s) 12.

As some illustrative examples, in one or more arrangements, control system 26 is configured to; control operation of motor 100 to control transport and/or positioning of samples by conveyor 98, gather data from sensor system 24 to evaluate samples, operate cleaning system 156, operate calibration system 160, and/or operate environmental control system 164.

In one or more arrangements, control system 26 is additionally or alternatively configured to control/adjust operation of one or more grain handling systems 12 based on data provided by optical sensor 150 of sensor system 24 and/or data received from one or more additional sensors 206. For instance, as some non-limiting illustrative examples, in one or more arrangements control system 26 may be configured to:

Adjust speed, throughput, and/or other operation of input and/or output grain conveyors;

Adjust throughput speed, temperatures, airflow, and/or other operation of grain dryers;

Control operation of sweepers in grain bins;

Control operation of spreaders in grain bins;

Control environmental control systems within grain bins; and/or

Control operation of other grain handling systems.

In one or more arrangements, control system 26 is additionally or alternatively configured to receive, store, and/or analyze data generated by sensors 206, sensors 150, or sensor system 24 to derive various data metrics including but not limited to, for example, grain characteristics (e.g., nutrient levels, composition, moisture content, density, damages to grains), potential problems (e.g., excessive moisture and/or temperature), data trends, deviations, possible nutrient deficiencies in soil, recommended rotation and/or soil treatment to remedy such deficiencies, marketable characteristics of the grain, and/or other data metrics. In one or more arrangements, control system 26 is additionally or alternatively configured to communicate status updates and/or alerts (e.g., via automated call, SMS, push notification, email, messaging on social networks, or any other means or methods for messaging).

In one or more arrangements, processes performed by control system 26 are configurable by a user via user interface 204 to customize/adjust how control system 26 controls operation of system 10 and/or grain handling system(s) 12 in response to user input and/or data from data sensors 150/206. For example, a user may configure control system 26 to perform a macro of operations in response to sample data satisfying a set of trigger conditions (e.g., a parameter being outside of a range specified by the user). Such a macro might include, for example, performing one or more operations to adjust operation of a grain handling system(s) 12 and sending a customized alert to the user in response to detecting the trigger condition.

Communication Circuit 210:

Communication circuit 210 is formed of any suitable size, shape, design and is configured to facilitate communication with devices to be controlled, monitored, and/or alerted by control system 26. In one or more arrangements, as one example, communication circuit 210 includes a transmitter (for one-way communication) or transceiver (for two-way communication). In various arrangements, communication circuit 210 may be configured to communicate with various components of system 10 and/or grain handling system(s) 12 using various wired and/or wireless communication technologies and protocols over various networks and/or mediums including but not limited to, for example, Serial Data Interface 12 (SDI-12), UART, Serial Peripheral Interface, PCI/PCIe, Serial ATA, ARM Advanced Microcontroller Bus Architecture (AMBA), USB, Firewire, RFID, Near Field Communication (NFC), infrared and optical communication, 802.3/Ethernet, 802.11/WIFI, Wi-Max, Bluetooth, Bluetooth low energy, UltraWideband (UWB), 802.15.4/ZigBee, ZWave, GSM/EDGE, UMTS/HSPA+/HSDPA, CDMA, LTE, FM/VHF/UHF networks, and/or any other communication protocol, technology or network.

Sensor(s) 206:

Sensor(s) 206 are formed of any suitable size, shape, or design and are configured to provide information relevant to the transportation, processing, storage, and/or other aspect (s) of grain. In some various arrangements, sensors 206 may include but are not limited to, for example, optical sensors, temperature sensors, particulate sensors, chemical sensors, moisture sensors, light sensors, positional sensors, geolocation sensors, and/or any other type of sensor.

In the arrangement shown, as one example, system 10 includes three reference proximity switch sensors 206 positioned above central hub 114 and configured to indicate when each reference proximity switch sensor 206 is aligned with reference marker holes 120. In this example arrangement, reference marker holes 120 are binary coded to indicate a set of unique positions (e.g., 001, 010, 011, 100, 101, 110, 111) to facilitate rotation of sample tray 110 to predetermined positions for positioning of samples. Additionally, or alternatively, in one or more arrangements, one or more components of sensors 206, and/or components of sensor system 24 may be formed along with control circuit 202 as a single combined unit. Alternatively, in some arrangements, sensor system 24 and/or sensors 206 may be communicatively connected with control circuit 202 by communication circuit 210.

User Interface 204:

User interface 204 is formed of any suitable size, shape, design and is configured to facilitate user control and/or adjustment of various components of system 10 and/or grain handling system(s) 12. In one or more arrangements, as one example, user interface 204 includes a set a inputs (not shown). Inputs are formed of any suitable size, shape, and design and are configured to facilitate user input of data and/or control commands. In various different arrangements, inputs may include various types of controls including but not limited to, for example, buttons, switches, dials, knobs, a keyboard, a mouse, a touch pad, a touchscreen, a joystick, a roller ball, or any other form of user input. Optionally, in one or more arrangements, user interface 204 includes a display (not shown). The display is formed of any suitable size, shape, design and is configured to facilitate the display of information of settings, sensor readings, time elapsed, and/or other information pertaining to samples tested by system 10 and/or operation of system 10 and/or grain handling system(s) 12. In one or more arrangements, the display may include, for example, LED lights, meters, gauges, the screen or monitor of a computing device, a tablet, and/or a smartphone. Additionally, or alternatively, in one or more arrangements, the inputs and/or may be implemented on a separate device that is communicatively connected to control circuit 202. For example, in one or more arrangements, operation of control circuit 202 may be customized using a smartphone or other computing device that is communicatively connected to the control circuit 202 (e.g., via Bluetooth, WIFI, and/or the internet).

From the above discussion it will be appreciated that the sensor system 24 presented herein improves upon the state of the art. More specifically, and without limitation, it will be appreciated that in one or more arrangements, a sensor system 24 is presented: that permits real-time monitoring of grain in grain handling systems 12; that is able to sample and evaluate grain in grain handling systems 12; that has an optical sensor 150 for evaluating grain in grain handling systems 12; that has an infrared (or near infrared) optical sensor 150 for evaluating grain in grain handling systems 12; that is configured to perform optical spectrometry on samples of grain; that is capable of self calibration; that is capable of self-cleaning; that is easy to manufacture; that is durable; that has a robust design; that is relatively inexpensive; that is high quality; and/or that can be used with any grain handling system, among other advantages and/or improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A system, comprising:
a grain handling system configured to handle grain;
a sensor system;
the sensor system operatively connected to the grain handling system;
the sensor system having an optical sensor;
a sample conveyor system;
the sample conveyor system operatively connected to the sensor system;
wherein the sample conveyor system is configured to receive samples of grain from the grain handling system, deliver the samples of grain to the sensor system, and remove the samples of grain from the sensor system;
wherein the sample conveyor system includes a conveyer having a stationary bottom and a rotating sample tray having a plurality of partitions;
wherein each of the partitions is defined by an inner wall, an outer wall, and a pair of partition walls extending from the inner wall to the outer wall;
wherein the conveyor is configured to slide the samples along the stationary bottom within the plurality of partitions when rotated;
and
wherein the sensor system is configured to measure one or more characteristics of the samples of grain delivered to the sensor system by the sample conveyor system.

2. The system of claim 1, wherein the optical sensor is an infrared optical sensor; and
wherein the sensor system includes an infrared light.

3. The system of claim 1, wherein the optical sensor has a lens.

4. The system of claim 1, further comprising a cleaning system;
the cleaning system operatively connected with the sensor system; and
wherein the cleaning system is configured to clean the optical sensor.

5. The system of claim 1, further comprising a recalibration system;
wherein the recalibration system is configured to recalibrate the optical sensor.

6. The system of claim 1, further comprising a recalibration system;
wherein the recalibration system is configured to recalibrate the optical sensor by:
using the optical sensor to capture a reference frame; and
recalibrating the optical sensor based on differences between the reference frame and an expected frame.

7. The system of claim 1, further comprising a recalibration system;
wherein the recalibration system is configured to recalibrate the optical sensor by:
using the optical sensor to capture a white reference frame;
using the optical sensor to capture a black reference frame; and recalibrating the optical sensor based on differences between the white and black reference frames and a set of expected frames.

8. The system of claim 1, wherein the optical sensor has a lens; and
wherein the sensor system and/or the sample conveyor system is configured to place the optical sensor and/or the lens in direct contact with the samples of grain.

9. The system of claim 1, wherein when one of the samples is delivered to the sensor system, the optical sensor is positioned above the one of the samples.

10. The system of claim 1, wherein when one of the samples is delivered to the sensor system, the optical sensor is positioned below the one of the samples.

11. The system of claim 1, wherein the sample conveyor system includes a sample collector;
wherein the sample collector is a funnel configured to collect the samples of grain in the grain handling system.

12. The system of claim 1, wherein the sample conveyor system includes a sample collector;
wherein the sample collector is configured to collect the samples of grain and drop the samples of grain into the plurality of partitions.

13. The system of claim 1,
wherein the stationary bottom has an opening; and
wherein the conveyor is configured to drop the samples of grain through the opening after the samples of grain are removed from the sensor system.

14. The system of claim 1, wherein the grain handling system is selected from the group consisting of a grain bin, a grain dryer, a drag chain, a conveyor, an auger, and an air transportation system.

15. The system of claim 1, wherein the partitions of the rotating sample tray each have an open top and an open bottom.

16. A system, comprising:
a grain handling system configured to handle grain;
a sensor system;
the sensor system operatively connected to the grain handling system;
the sensor system having an optical sensor and a lens;
a sample conveyor system;
the sample conveyor system operatively connected to the sensor system;
wherein the sample conveyor system is configured to receive samples of grain from the grain handling system, deliver the samples of grain to the sensor system, and remove the samples of grain from the sensor system;
wherein the sample conveyor system includes a turntable type conveyor having a stationary bottom and a rotating sample tray;
wherein the rotating sample tray includes a central hub, a circular outer wall extending around the central hub, and a plurality of partition walls extending from the central hub to the circular outer wall;
wherein the central hub, the circular outer wall, and the plurality of partition walls form a plurality of partitions;
wherein the rotating sample tray is configured to slide the samples along the stationary bottom within the plurality of partitions when rotated;
wherein the sensor system is configured to measure one or more characteristics of the samples of grain delivered to the sensor system by the sample conveyor system; and
a recalibration system;

the recalibration system configured to recalibrate the optical sensor.

17. The system of claim 16, wherein the recalibration system is configured to recalibrate the optical sensor by:

using the optical sensor to capture a reference frame; and recalibrating the optical sensor based on differences between the reference frame and an expected frame.

18. The system of claim 16, wherein the recalibration system is configured to recalibrate the optical sensor by:

using the optical sensor to capture a white reference frame;

using the optical sensor to capture a black reference frame; and recalibrating the optical sensor based on differences between the white and black reference frames and a set of expected frames.

19. The system of claim 16, wherein the recalibration system is configured to recalibrate the optical sensor periodically.

20. The system of claim 16, wherein the recalibration system is configured to recalibrate the optical sensor after each sample of grain is evaluated.

21. The system of claim 16, wherein the recalibration system is configured to recalibrate the optical sensor before each sample of grain is evaluated.

22. The system of claim 16, wherein the recalibration system is configured to recalibrate the optical sensor based on a reading from a temperature sensor.

23. The system of claim 16, wherein the recalibration system is configured to recalibrate the optical sensor based on a reading from a humidity sensor.

24. A system, comprising:

a grain handling system configured to handle grain;

a sensor system;

the sensor system operatively connected to the grain handling system;

the sensor system having an optical sensor and a lens;

a sample conveyor system;

the sample conveyor system operatively connected to the sensor system;

wherein the sample conveyor system is configured to receive samples of grain from the grain handling system, deliver the samples of grain to the sensor system, and remove the samples of grain from the sensor system;

wherein the sample conveyor system includes a conveyor having a stationary bottom and a rotating sample tray;

wherein the rotating sample tray has a plurality of partitions separated from one another and is configured to receive and hold the samples of grain therein;

wherein the rotating sample tray is configured to slide the samples of grain along the stationary bottom within the plurality of partitions when rotated;

wherein the sensor system is configured to measure one or more characteristics of the samples of grain delivered to the sensor system by the sample conveyor system;

a cleaning system;

the cleaning system operatively connected to the sensor system; and wherein the cleaning system is configured to clean the sensor system.

25. The system of claim 24, wherein the cleaning system is configured to clean the sensor system periodically.

26. The system of claim 24, wherein the cleaning system is configured to clean the sensor system after each sample of grain is evaluated.

27. The system of claim 24, wherein the cleaning system is configured to clean the sensor system before each sample of grain is evaluated.

28. The system of claim 24, wherein the cleaning system is configured to clean the lens.

29. The system of claim 24, wherein the cleaning system is configured to clean an optical filter of the optical sensor.

30. The system of claim 24, wherein the cleaning system is configured to clean the sensor system by vibrating one or more components of the sensor system.

31. The system of claim 24, wherein the cleaning system includes a blower configured to clean the sensor system by blowing dust off of one or more components of the sensor system.

32. The system of claim 24, wherein the cleaning system includes a brush configured to clean the sensor system by brushing one or more components of the sensor system.

33. The system of claim 24, further comprising a fan associated with the sample conveyor system, wherein the fan provides positive airflow to the sample conveyor system.

34. The system of claim 24, further comprising a fan associated with the sensor system, wherein the fan provides positive airflow to the sensor system.

35. A system, comprising:

a grain handling system configured to handle grain;

a sensor system;

the sensor system operatively connected to the grain handling system;

the sensor system having an optical sensor and a lens;

a sample conveyor system;

the sample conveyor system operatively connected to the sensor system;

wherein the sample conveyor system is configured to receive samples of grain from the grain handling system, deliver the samples of grain to the sensor system, and remove the samples of grain from the sensor system;

wherein the sensor system is configured to measure one or more characteristics of the samples of grain delivered to the sensor system by the sample conveyor system;

a fan;

the fan associated with the sample conveyor system; and wherein the fan is configured to provide a source of positive airflow to the sample conveyor system thereby suppressing dust.

36. The system of claim 35, wherein the sample conveyor system includes a turntable type conveyor having a stationary bottom and a rotating sample tray;

wherein the rotating sample tray includes a central hub, a circular outer wall extending around the central hub, and a plurality of partition walls extending from the central hub to the circular outer wall;

wherein the central hub, the circular outer wall, and the plurality of partition walls form a plurality of partitions;

wherein the rotating sample tray is configured to slide the samples along the stationary bottom within the plurality of partitions when rotated.

37. A system, comprising:

a grain handling system configured to handle grain;

a sensor system;

the sensor system operatively connected to the grain handling system;

the sensor system having an optical sensor and a lens;

a sample conveyor system;

the sample conveyor system operatively connected to the sensor system;

wherein the sample conveyor system is configured to receive samples of grain from the grain handling system, deliver the samples of grain to the sensor system, and remove the samples of grain from the sensor system;

wherein the sensor system is configured to measure one or more characteristics of the samples of grain delivered to the sensor system by the sample conveyor system;

a fan;

the fan associated with the sensor system; and wherein the fan is configured to provide a source of positive airflow to the sensor system thereby suppressing dust.

38. The system of claim 37, wherein the sample conveyor system includes a turntable type conveyor having a stationary bottom and a rotating sample tray;

wherein the rotating sample tray includes a central hub, a circular outer wall extending around the central hub, and a plurality of partition walls extending from the central hub to the circular outer wall;

wherein the central hub, the circular outer wall, and the plurality of partition walls form a plurality of partitions;

wherein the rotating sample tray is configured to slide the samples along the stationary bottom within the plurality of partitions when rotated.

* * * * *